3,087,854
NON-STAINING PYRETHRIN INSECTICIDES
Harry M. Iwata, John D. Pollard, and William O. Israel, Baltimore, Md., assignors to FMC Corporation, New York, N.Y., a corporation of Delaware
No Drawing. Filed Jan. 31, 1962, Ser. No. 170,226
8 Claims. (Cl. 167—24)

This invention relates to an improved method for the production of household insecticides, and particularly to a process for the preparation of non-staining, oil dilutable pyrethrins extracts. This application is a continuation-in-part of copending application Serial No. 850,506, filed November 3, 1959, now abandoned.

The separation of pure pyrethrins from pyrethrum flowers has been the subject of much investigation. Standard commercial extraction procedures, which involve treatment of pyrethrum flowers with organic solvents, invariably extract substantial amounts of inactive and colored impurities, including waxes (high molecular weight alcohols and esters), resinous substances (natural resins and pyrethrins polymers), and lesser amounts of free organic acids, liquid esters, oils, and chlorophyll and carotenoid color bodies, along with the active pyrethrins. An ideal household insecticide should be essentially free of all of these impurities: the crude pyrethrum extracts contain constituents which are insoluble in the Freons (chlorofluoromethanes and ethanes) which are used as propellants in aerosol applications, and thus tend to clog the orifices of aerosol dispersers; other impurities cause staining of fabrics and other surfaces to which the insecticide may be applied; other impurities contribute undesirable color to the final product.

Although a number of methods has been suggested in the past for the purification of crude pyrethrum extracts, these processes have either not completely removed waxes, resins and color bodies, or have been accompanied by such substantial losses of active ingredient as to be impractical. Accordingly, the principal object of the present invention is to provide a pyrethrum extract which is free of undesirable impurities, yet is produced in essentially quantitative yield from the original extract of the pyrethrum flower.

Another object is to provide non-staining and essentially colorless pyrethrum extract.

Another object is to provide a pyrethrum extract characterized by complete solubility in base oils at any dilution.

A further object is to provide a pyrethrum extract having a cloud point of less than 0° C. and a Freon-insolubles content of less than 0.5%.

A still further object is to provide a process for the large-scale production of pure pyrethrum extract with minimum losses of active ingredient due to processing.

These and other objects and advantages will become apparent from the following description of this invention.

It has been discovered that when crude pyrethrum extracts are first separated from waxy impurities, which separation is accomplished by a novel process which allows ready separation of the waxes with virtually no losses of active ingredients, then the resinous and other impurities can also be completely removed. These products, when carbon-treated before or after removal of the resins, are non-staining, and meet the strictest specifications for household aerosol insecticides. Incomplete separation of the waxes results in incomplete removal of resins and pigments in subsequent purification steps; heretofore, our attempts at complete separation of waxes resulted in substantial losses of active ingredients as well, so that in practice non-staining pyrethrins could not heretofore be provided on a commercial scale.

Crude pyrethrum extract is obtained from pyrethrum flowers in a variety of ways. Pyrethrum flowers are extracted with organic solvents, such as kerosene, hexane, petroleum ether, acetone or ethylene dichloride, usually by percolation or centrifuging. The active ingredients, which are identified as pyrethrin I, pyrethrin II, cinerin I and cinerin II, are viscous liquids or crystalline solids, soluble in organic solvents. A procedure for the extraction of pyrethrum flowers with ethylene dichloride is described by Gnadinger et al., Ind. Eng. Chem. 24, 988 (1932). Other long established commercially used procedures extract the flowers with acetone, kerosene or hexane. The solvent may then be removed, to leave a dark viscous mass, called the oleoresin. Whatever the solvent employed, large quantities of inactive impurities are extracted with the pyrethrins. These impurities, which have been classified principally as waxes, resins and color bodies, normally make up 60% to 85% of the oleoresin.

Another source of crude pyrethrins is the concentrated solutions of pyrethrum extract in high boiling aliphatic solvents, such as kerosene, which are shipped to the United States from Africa, Japan and South America. These solutions result from the solvent extraction of pyrethrum flowers, and normally contain 20% to 30% of pyrethrins, by weight of solution. In addition to the pyrethrins, generally another 150% to 300%, by weight of pyrethrins, is inert contaminants of the sort previously discussed. These concentrated extracts may be used directly in the process of this invention, or they may first be stripped of solvent.

By the process of this invention, crude oleoresin, or the concentrated extract described above, is readily freed of waxy and staining impurities, without significant loss of active ingredients. To accomplish this separation, the oleoresin is dissolved or slurried in anhydrous methanol in such a manner as to form two phases: a methanolic phase and a non-methanolic phase. Our early attempts to employ methanol as a precipitant for waxy impurities resulted in substantial losses of active ingredient, due to difficulties in isolation of the waxy or gelatinous precipitate and in recovery of active pyrethrins from the precipitated mass. It has now been discovered that not only are the precipitated waxes readily separated from the extracted pyrethrins, but also any active ingredients which separate with the waxes are readily recovered by dissolving or slurrying the oleoresin in the methanol in the presence of at least about 40%, by weight of oleoresin, of a filter aid cooling to a temperature below 10° C. and filtering. An optional method, described and claimed in an application by one of us, William O. Israel, Serial No. 144,444, filed October 11, 1961, accomplishes this desired result without the use of filter aid, by dissolving or slurrying the oleoresin in methanol at temperatures of 35° C. and higher, cooling to a temperature below 15° C., separating and washing the thus precipitated waxes at least three times with methanol at 35° C. or higher.

The amount of filter aid used in the wax separation method should be at least about 40% by weight of crude oleoresin in order to obtain effective separation of waxes from standard oleoresins containing 150% to 300% inerts, by weight of pyrethrins. If less than about 40% of filter aid is used, not only is filtration of precipitated material very difficult or impossible, but also substantial amounts of pyrethrins are occluded with the precipitated material in such a fashion that they cannot be recovered, even with excessive washings. The maximum amount of filter aid used in this step is controlled by practical handling considerations. In practice, 40% to 60% of filter aid, by weight of crude oleoresin, is preferred since above this range unnecessarily large filtration equipment and volumes of methanol may be needed. As the filter aid may be used any of the standard commercial products, such as those provided under the proprietary names "Celite" by the Johns-Manville Corp., "Dicalite" by the Dicalite Company, "Tenn-Flo" by Tennessee Products and Chemical Corp., and "Adsorbol" by Sierra Talc and Clay Co. The filter aids are diatomaceous silica products, amorphous in character, having high bulk and surface area. Most filter aids are described as having a bulk density of 7–25 pounds per cubic foot, particle size of 1–100 microns, and surface area of 20,000-100,000 sq. ft. per pound.

The crude pyrethrum extract may be combined with the methanol and the filter aid in a number of different ways. For example, the anhydrous methanol and the crude oleoresin may be mixed together, followed by addition of dry filter aid to the mixture. When this procedure is employed, the premature precipitation of waxes, in the absence of a filter aid, should be avoided, and thus the initial blending temperature should be above that at which the methanol precipitates solids from the pyrethrum extract; for example, methanol and crude oleoresin may be initially blended at a temperature above 40° C., at which temperature the immiscible waxes are liquid, and a heterogeneous liquid-liquid dispersion in methanol results. When filter aid is added to this dispersion, even adsorption of waxes on the filter aid takes place on cooling the mixture below the solodification point of the waxes. If, on the other hand, the methanol and pyrethrins are initially mixed below the solidification point of the waxes, a gummy precipitate forms at once, which precipitate is not properly adsorbed on the subsequently added filter aid; filtration is very difficult, even when large excesses of filter aid are added, and the subsequent recovery of occluded pyrethrins is very poor.

In a preferred process, a slurry of the requisite amount of filter aid in anhydrous methanol is prepared, and the crude oleoresin, either solvent-free or containing kerosene-type solvents as previously described, is added to the slurry. When this method is employed, adsorption of the precipitated waxes on the filter aid takes place preferentially to separate agglomeration of the waxes, even at very low temperatures when there is no dissolution or melting of the oleoresin. This procedure may be carried out at temperatures of 0° C. and lower, although there appears to be no advantage to maintaining very low temperatures, as well as at temperatures of 50° C. and higher, the upper temperature limit being controlled only by the volatility of the solvent.

The amount of methanol used should be about 1 to 3 times the total weight of oleoresin to be added; that is, the final concentration should be 25% to 50% by weight of oleoresin in methanol. When insufficient methanol is present, incomplete precipitation of the waxes occurs. As is the custom in comercial operations, large amounts of solvent should be avoided because of recovery and handling costs. Essentially anhydrous methanol should be used, and the presence of as little as 5% of water is harmful.

When the precipitation and adsorption are complete, the precipitated waxes on the filter aid are separated merely by filtration. This filtration occurs with surprising ease, compared with the precedures heretofore required for separating precipitated waxes from pyrethrins solutions. The filter cake is then washed with methanol, to recover occluded pyrethrins. Whatever order of combination of reagents is employed, the final cooling, filtration and washing should be carried out below about 10° C., for maximum removal of waxes. As previously practiced, methanol precipitation of waxes from crude pyrethrum extracts could not be utilized except with substantial losses of active ingredient, due to difficulties of separation of the precipitate and recovery of pyrethrins from the precipitated mass.

The optional wax separation method requires no filter aid at all. In this method, the concentrated crude extracts are mixed with at least an equal amount by weight of anhydrous methanol, at a temperature in the range of 35° to 55° C., resulting in the precipitation of most of the heavy waxes. The mixture, or the separated methanolic liquid extract, is cooled to a temperature of 15° C. or lower, causing the remaining waxes to precipitate. The combined wax residue is subjected to at least three successive steps of washing with at least an equal weight of anhydrous methanol at a temperature of 35° to 55° C., and recovering essentially all of the pyrethrins from this residue in the methanolic wash liquids. Before the wash liquids are subjected to further purification, they are cooled to a temperature of 15° C. or lower to remove any traces of remaining wax.

Very little pyrethrins are lost by the disclosed process, a result that is very surprising in view of the early purification methods. As previously practiced, methanol washing of waxes from crude pyrethrum extracts were not utilized because it was expected that substantial losses of active ingredient would occur, owing to difficulties of separation of the precipitate and recovery of pyrethrins from the thick precipitated mass.

The methanol precipitation process of this invention remove not only substantially all of the so-called waxes from the crude pyrethrum extract, but also some of the color bodies originally present. The remaining colored and strain-producing impurities are conveniently removed at this stage with activated carbon, employing standard techniques. The product is completely non-straining, although the presence of residual resins produces cloudiness or precipitation on dilution with common base oils such as kerosene at ordinary temperatures. Because of its non-staining properties, this product may be used directly in some applications, such as in oil-free solutions in synergists, such as piperonyl butoxide, where the presence of residual resins is not a disadvantage.

As was stated earlier, it was found that, for a clear oil-dilutable product, essentially all of the waxes must be removed before the resins can be satisfactorily removed. If a pyrethrins extract containing both waxes and resins is subject to any of the well-known "deresining" processes, or even to the improved process for the removal of resins described below, the waxes act as cosolvents for the resins, and no really effective separation results.

Since the resins are completely soluble in methanol, the methanol must be removed completely from the dewaxed and decolorized pyrethrum extract, before efficient separation of resins can be achieved. To avoid decomposition of the pyrethrins, the temperature should be kept below about 50° C. during stripping of the methanol, under reduced pressure. The presence of an antioxidant at this stage aids in inhibiting degradation of the active ingredients. The stripping may be carried to dryness, but since high concentrations of purified pyrethrins tend to lose their activity faster than more dilute solutions, and since the dewaxed extract at this stage may contain 30% to 50% or more of active pyrethrins, it is preferred to add a high-boiling solvent before or during removal of the methanol, to avoid concentrations of pyrethrins higher than about 30%. High boiling petroleum distillates are conveniently used for this purpose, such as kerosene, which is a standard insecticidal "base oil," boiling in the range of 350–500° F. Other high boiling solvents may also be used. If a base oil such as kerosene were initially present in the crude pyrethrum extract before dewaxing, this may be retained during stripping of the methanol.

To the methanol-free extract is then added sufficient hexane to dilute the pyrethrins to a concentration of about 3% to 7% pyrethrins by weight of total solution. This is achieved, in a preferred process, by adding 5 to 10 volumes of hexane to an extract of 15% to 30% pyrethrins. This solution is chilled to below −10° C., stirred, and allowed to stand while the resins settle out.

Effective separation of resins by this process requires the use of at least five volumes of hexane, or more if necessary to produce a solution containing about 3% to 7% of pyrethrins; when less hexane is used there is inadequate resin precipitation, and the final product is not infinitely dilutable with base oils to yield clear solutions. There is no advantage to the use of more than ten volumes of hexane. Temperatures in the range of −10° to −30° C. and lower are effective, with best results below −15° C.

The precipitated resins are then separated, by filtration or decantation, from the hexane solution. Small amounts of filter aid may be used as an aid to filtration, which is preferably carried out at temperatures below −10° C. The precipitate contains some occluded pyrethrins, which may be recovered by washing or re-extracting with hexane. The filtered extract and the washings are then stripped of hexane under reduced pressure, in the presence of base oil or other high boiling diluent in order to maintain the final concentration of pure pyrethrins below about 30%.

By the process of this invention, overall yields of 95% to 100%, in terms of recovery of pyrethrins based on the amount of active ingredient present in the crude starting material, are obtained.

The products meet or exceed all requirements for pyrethrins compositions, and are characterized by the total absence of any discernible stain when used at commercial insecticide concentrations, complete solubility in base oil at any dilution, a cloud point of less than 0° C., a Freon-insoluble content of less than 0.5%, measured by the procedure reported by Wachs et al., Ind. Eng. Chem., Anal. ed. 16, 453–4 (1944), a moisture content of less than 0.5%, color of less than 11 on the Gardner-Holdt scale for 20% extract, and suitable for the preparation of blends with synergists such as piperonyl butoxide and with other pesticides. The products are readily made up to the commercial 20% or No. 100 (11.8% pyrethrins) extracts.

All or portions of this overall process may be carried out in batch operations or continuously. The following examples illustrate various modes of the practice of this invention. Pyrethrins analyses reported herein are based on the Methods of Analysis of the Association of Official Agricultural Chemists, 8th Edition. All parts are by weight unless otherwise indicated.

*Example I*

To 1,115 parts of anhydrous methanol was added 500 parts of crude pyrethrum extract from which substantially all of the base oil had been removed by high-vacuum stripping. The oil-free pyrethrum extract analyzed 30.70% pyrethrums by the A.O.A.C. (Eighth Edition) method of assay. The mixture was heated to 50° C. and stirred for 0.5 hour, and then 250 parts of "Speed Flow Dicalite" filter aid was added. Maintaining efficient stirring, the slurry was cooled for 1 hour at 0° C., then filtered on a Buchner funnel. The filter cake was washed with three 500-part portions of anhydrous methanol at 0° C. The combined methanolic extract and washings were then subjected to four successive carbon treatments at 50° C., employing 35 parts of activated "Pittsburg RC" carbon and 20 parts of "Speed Flow Dicalite" filter aid for each treatment, filtering and washing the residue with anhydrous methanol after each treatment. To the combined carbon-treated extract and washings was then added 294 parts of refined kerosene ("Ultrasene") and the mixture freed of methanol by distillation at reduced pressure. The residue (497 parts) was free of staining properties but not completely soluble in base oils. This product was mixed with 3,865 parts of hexane, and the resulting mixture stirred at −18° C. for 2.5 hours. The cold hexane solution was decanted from the precipitated resinous substances, and filtered. The clear filtrate was concentrated under vacuum, to remove the hexane and to yield 472 parts of the product, which analyzed 29.3% pyrethrins by the A.O.A.C. (Eighth Edition) method of assay, was dilutable with base oils to produce clear solutions, and was free of staining properties.

*Example II*

To a stirred slurry of 1,250 parts of anhydrous methanol and 300 parts of "Speedplus" filter aid, a filter aid of the Dicalite Company having a relative filtration rate of 14 gal./ft.$^2$/hr., heated to 40° C., was added 504 parts of crude pyrethrum extract from which the base oil had been stripped under vacuum. The crude extract analyzed 35.22% pyrethrins by the A.O.A.C. (Eighth Edition) method of assay. After stirring at 40° C. for 0.5 hour, the slurry was cooled at 0° C. for 1 hour, filtered, and the filter cake washed as described in Example I. The combined methanolic extract was treated with three successive 58.3-part portions of activated carbon at 40° C., with filtering after each treatment and washing with anhydrous methanol. To the combined carbon-treated methanolic extract and washes was added 308 parts of refined kerosene, and the methanol was removed under reduced pressure. To the residue was added another 31 parts of kerosene, to yield a total of 653 parts of product, which showed excellent non-staining properties, but was not completely soluble in base oils. To 261 parts of this product was added 1,320 parts of hexane, and the mixture stirred at −15° C. for 2.5 hours. The hexane solution was decanted from precipitated resinous material and filtered cold to remove dispersed resins. The precipitated resins, together with the filter-cake, were extracted three times with 200-part portions of hexane at room temperature, and the combined hexane extract was cooled to −15° C. for 2.5 hours, and filtered. The filtrate was added to the main hexane solution, 97 parts of refined kerosene was added, and the combined solutions were concentrated under vacuum to yield 348 parts of product, analyzing 19.6% pyrethrins by the A.O.A.C. (Eighth Edition) method of assay. This product was non-staining and produced clear solutions when diluted with base oils.

*Example III*

To a stirred slurry of 755 parts of anhydrous methanol and 250 parts of "Speed Flow Dicalite" filted aid, heated to 55° C., was added 502 parts of crude pyrethrum extract containing 125 parts of refined kerosene. This crude extract analyzed 25.1% pyrethrins by the standard A.O.A.C. (Eighth Edition) method of assay. After stirring for 0.5 hour, the slurry was cooled to 7° C., filtered and washed as described in Example I. The combined methanolic extracts were decolorized with activated carbon as described in Example I, and concentrated under vacuum to remove methanol, in the presence of 1,250 parts of "piperonyl butoxide" (a commercial pyrethrins synergist) to yield 1,570 parts of an amber liquid which was substantially non-staining and soluble in base oils.

*Example IV*

To a slurry of 350 parts of anhydrous methanol and 125 parts of "Celite 545," a high flow filter aid, was added, at room temperature, 250 parts of crude pyrethrum extract containing 75 parts refined kerosene and analyzing as 20.8% pyrethrins. After stirring at room temperature for 0.5 hour, the slurry was cooled to −10° C., filtered, and washed with cold anhydrous methanol. The combined methanolic extract and washings was chilled to 0° C. and treated with active carbon, as described in Example I. The carbon-treated methanolic extract was concentrated in the presence of 55 parts of refined kerosene to yield 215 parts of methanol-free residue which was substantially non-staining but not completely soluble in base oils. To 128 parts of this product was added 590 parts (6 volumes) of hexane, and the resulting mixture was stirred at −20° C. for 2.5 hours. The hexane solution was separated from precipitated resinous substances and the latter re-extracted as described in Example II. The clear hexane solution was concentrated under vacuum and adjusted to a final weight of 175 parts with refined kerosene. This solution analyzed 17.1% pyrethrins by the A.O.A.C. (Eighth Edition) method of assay. The overall yield, calculated on starting crude pyrethrum extract, was 96.7%. The final product was non-staining, and was completely soluble in base oils at all dilutions.

*Example V*

To a stirred slurry of 350 parts of anhydrous methanol and 125 parts of "Adsorbol A–46" filter aid, a product of the Sierra Talc and Clay Company, characterized by an average particle size of 2.46 microns, specific surface of 10,290 cm.$^2$/g., and apparent density of 20–22 lbs./ft.$^3$. This mixture was cooled to 0° C., and 250 parts of crude pyrethrum extract from which substantially all solvent had been removed by high vacuum stripping was added. The stripped crude extract analyzed 30.7% pyrethrins by the A.O.A.C. (Eighth Edition) method of assay. The slurry was stirred at 0° C. for 1 hour, and then filtered and washed as described in Example I. The combined methanolic extract was treated with three successive 20-part portions of "Darco S–51–RL" activated carbon at 25° C. at 0.5 hour intervals, filtering after the final treatment. The filter-cake was washed with anhydrous methanol, and the washes were added to the main methanolic solution. The combined carbon-treated methanolic extract was concentrated under vacuum at a maximum pot temperature of 50° C. to remove the methanol, and the solvent-free residue was stirred with 1,000 parts of hexane at room temperature for 20 minutes. The hexane dispersion was then stirred for 2.5 hours at −25° C. The cold hexane solution was decanted from precipitated resinous substances and filtered to remove dispersed particles. The filter-cake and precipitated resins were re-extracted with three successive 88-part portions of hexane at room temperature, and the combined extracts were stirred at −25° C., filtered, and combined with the main hexane solution. To the combined hexane solutions was then added 170 parts of refined kerosene, and the hexane was removed under vacuum. The residue was adjusted to 436 parts by the further addition of "Ultrasene." The product thus obtained was light amber in color, non-staining and completely soluble in base oils. It assayed 16.9% pyrethrins by the A.O.A.C. (Eighth Edition) method of analysis. The overall yield, calculated on the starting crude pyrethrum extract, was 95.6%.

*Example VI*

To 500 grams of crude oleoresin, containing 21.5% pyrethrins by the A.O.A.C. method of analysis, was added 1,200 ml. of anhydrous methanol. The resulting mixture was agitated for 30 minutes at 40° C. and then cooled to 10° C. The insoluble substances which precipitated were allowed to settle and the supernatant methanol solution was removed. The residue was then washed with 600 ml. of anhydrous methanol for 30 minutes at 40° C. under vigorous agitation. The mixture was again allowed to settle and, the supernatant liquid was decanted. The residue was washed with three additional 600 ml. portions of anhydrous methanol in the same manner. The first two methanol wash liquids were combined with the supernatant liquid from the initial extraction, while the remaining wash liquids were passed into a reserve vessel to be used in the initial extraction of a subsequent batch. The combined methanolic extract and washing were then cooled to 10° C. A small amount of solids precipitated. The supernatant liquid was decanted and subjected to three successive carbon treatments at 30° C., employing 37 grams of Darco S–51–RL decolorizing carbon and 24 grams of Celite 545 filter aid for one hour and filtered after each treatment.

To the combined carbon-treated extract and washings was added 200 ml. of refined kerosene ("Ultrasene") and 2.5 grams of di-tert.-butyl-p-cresol. The mixture was freed of methanol by distillation at reduced pressure. The residue (500 grams) was free of staining properties but not completely soluble in base oils. This product was mixed with 2,800 ml. of hexane, and the resulting mixture stirred at −18° C. for 2 hours. After the addition of 27 grams of Celite 545 filter aid, the slurry was stirred at −18° C. for an additional hour, and settled for one hour at −18° C. The hexane solution was filtered through the filter-aid. The precipitated resins were washed with four 360-ml. portions of hexane at room temperature and the washings combined with the original filtrate. The combined solution was cooled to −18° C. to throw out any further traces of resin. The combined hexane solution to which 2.9 grams of di-tert.-butyl-p-cresol was added, was concentrated under vacuum, to remove the hexane, and the residue diluted to 500 grams with refined kerosene, to yield an extract which analyzed 20.3% pyrethrins by the A.O.A.C. (Eighth Edition) method of assay, was dilutable with base oils to produce clear solutions, and was free of staining properties. The concentration represented a recovery of 95% of pyrethrins present in the crude oleoresin.

It is apparent that this invention is susceptible to numerous modifications within the scope of the disclosure, and it is intended to include such variations within the scope of the following claims.

We claim:
1. The method of producing pyrethrum extracts which are non-staining and dilutable with kerosene-type solvents without the formation of a precipitate which comprises the steps of
   (1) mixing said pyrethrum extract with at least an equal weight of anhydrous methanol;
   (2) cooling the methanol extract to a temperature below 15° C. to precipitate a waxy residue;
   (3) treating the waxy residue with more methanol to recover occluded pyrethrins;
   (4) decolorizing the dewaxed methanol solutions with activated carbon;
   (5) distilling the methanol from the solution;
   (6) deresinifying the pyrethrins by forming a solution of the pyrethrins in a hydrocarbon under conditions which retain the pyrethrins in solution while causing inert resins to precipitate and concentrating the solution in the presence of a carrier hydrocarbon.

2. The method of claim 1, wherein the methanol is distilled from the filtrate in the presence of piperonyl butoxide.

3. The method of claim 1, wherein the methanol is distilled from the filtrate in the presence of an aliphatic solvent boiling in the range of 350–500° F.

4. The method of recovering non-staining pyrethrins in high yields from crude extracts of pyrethrum flowers which comprises the steps of
   (1) mixing said pyrethrum extracts with at least an equal weight of anhydrous methanol;
   (2) cooling to below 10° C. thereby precipitating a waxy residue;
   (3) separating and washing the waxy residue in anhydrous methanol;
   (4) combining all methanol solutions to recover a methanolic solution of dewaxed pyrethrins;
   (5) Treating said methanolic solution with activated carbon;
   (6) distilling the methanol from the carbon-treated solution;
   (7) forming a solution of 3% to 7% pyrethrins by weight of total solution by addition of hexane;
   (8) cooling to below −10° C. until precipitation is complete;
   (9) separating the precipitate from the hexane solution and concentrating the hexane solution in the presence of a high boiling solvent, thereby producing a non-staining pyrethrins extract which is dilutable with kerosene-type solvents.

5. The method of recovering non-staining pyrethrins in high yields from crude extracts of pyrethrum flowers containing 15% to 40% pyrethrins which comprises the steps of mixing said pyrethrum extract with at least an equal weight of anhydrous methanol and at least 40%, by weight of said extract, of diatomaceous earth filter aid; cooling to below 10° C., thereby precipitating waxes on the filter aid; filtering the wax-coated filter aid, and washing the residue with cold methanol, recovering the methanolic filtrates; treating said methanolic filtrates with activated carbon; and distilling off the methanol, thereby recovering non-staining pyrethrins in high yields from crude extracts of pyrethrum flowers.

6. The method of recovering non-staining pyrethrins in high yields from crude extracts of pyrethrum flowers comprising 15% to 40% pyrethrins and a minor proportion of an aliphatic solvent boiling in the range of 350–500° F. which comprises the steps of dissolving said pyrethrum extract in 1 to 3 times, by weight of said extract, of anhydrous methanol; adding 40% to 60%, by weight of said extract, of diatomaceous earth filter aid; cooling to below 10° C., thereby precipitating waxes on the filter aid; filtering the wax-coated filter aid, and washing the residue with cold methanol, recovering the methanolic filtrates; treating said methanolic filtrates with activated carbon; and distilling off the methanol, thereby recovering non-staining pyrethrins in high yields, dissolved in said aliphatic solvent.

7. The method of recovering non-staining pyrethrins in high yields from crude extracts of pyrethrum flowers which comprises the steps of mixing said pyrethrum extracts with at least an equal weight of anhydrous methanol and at least 40%, by weight of said extracts, of diatomaceous earth filter aid; cooling to below 10° C., thereby precipitating waxes on the filter aid; separating and washing the wax-coated filter aid to recover a solution of dewaxed pyrethrins in anhydrous methanol; treating said methanolic solution with activated carbon; distilling the methanol from the carbon-treated solution; forming a solution of 3% to 7% pyrethrins by weight of total solution by addition of hexane; cooling to below —10° C. until precipitation is complete; separating the precipitate from the hexane solution; and concentrating the hexane solution in the presence of a high boiling solvent, thereby producing a non-staining pyrethrins extract which is dilutable with kerosene-type solvents.

8. The method of recovering non-staining pyrethrins in high yields from crude solvent-free extracts of pyrethrum flowers which comprises the steps of dissolving said solvent-free pyrethrum extract in 1 to 3 times, by weight of said extract, of anhydrous methanol, said methanol containing 40% to 60% by weight of said crude extract of diatomaceous earth filter aid, said dissolution being carried out above the solidification temperature of said extract; cooling to below 10° C., thereby precipitating waxes on the filter aid; filtering the wax-coated filter aid, and washing the residue with cold methanol, recovering the methanolic filtrate and washings, treating the methanolic filtrate and washings with activated carbon; diluting the decolorized methanolic solution with a high boiling aliphatic solvent and distilling off the methanol; diluting the methanol-free solution with hexane to form a solution of 3% to 7% pyrethrins by weight of total solution; cooling to —15° C. to —30° C. until precipitation is complete; separating the precipitate from the hexane solution; and stripping hexane from said solution, thereby producing a non-staining pyrethrins extract in a high boiling aliphatic solvent.

References Cited in the file of this patent

Ind. and Eng. Chem., vol. 24, No. 9, September 1932, pp. 988–991.